United States Patent [19]

Kawamoto et al.

[11] Patent Number: 4,486,799

[45] Date of Patent: Dec. 4, 1984

[54] TAPE GUIDE DEVICE FOR VIDEO TAPE RECORDER

[75] Inventors: Hideo Kawamoto, Machida; Seigo Uehara, Fujisawa, both of Japan

[73] Assignee: Sony Corporation, Tokyo, Japan

[21] Appl. No.: 347,552

[22] Filed: Feb. 10, 1982

[30] Foreign Application Priority Data

Feb. 12, 1981 [JP] Japan ................................ 56-18257

[51] Int. Cl.³ .............................................. G11B 15/60
[52] U.S. Cl. ................................................ 360/130.23
[58] Field of Search ..................... 360/130.23, 130.24, 360/130.2, 130.21, 130.22

[56] References Cited

U.S. PATENT DOCUMENTS 2,560,254  7/1951  Shickel ........................... 360/130.1
4,381,530  4/1983  Owada et al. ................. 360/130.23

Primary Examiner—Bernard Konick
Assistant Examiner—Paul Stefanski
Attorney, Agent, or Firm—Lewis H. Eslinger; Alvin Sinderbrand

[57] ABSTRACT

A mounting structure for tape guide elements, for use with a guide drum adapted to have a tape wound in an Ω-shaped configuration around its periphery, has a base fixed adjacent to the root portion of the drum and has first and second guide supports for the guide elements. At least one of the guide elements is movable relative to the base between an operative position close to the drum in which it guides the tape about the drum and an inoperative position at a further distance from both the other guide element and the periphery of the drum. A pair of spaced apart positioning members engage the periphery of the drum at its root portion for accurately locating the operative positions of the tape guide elements.

9 Claims, 8 Drawing Figures

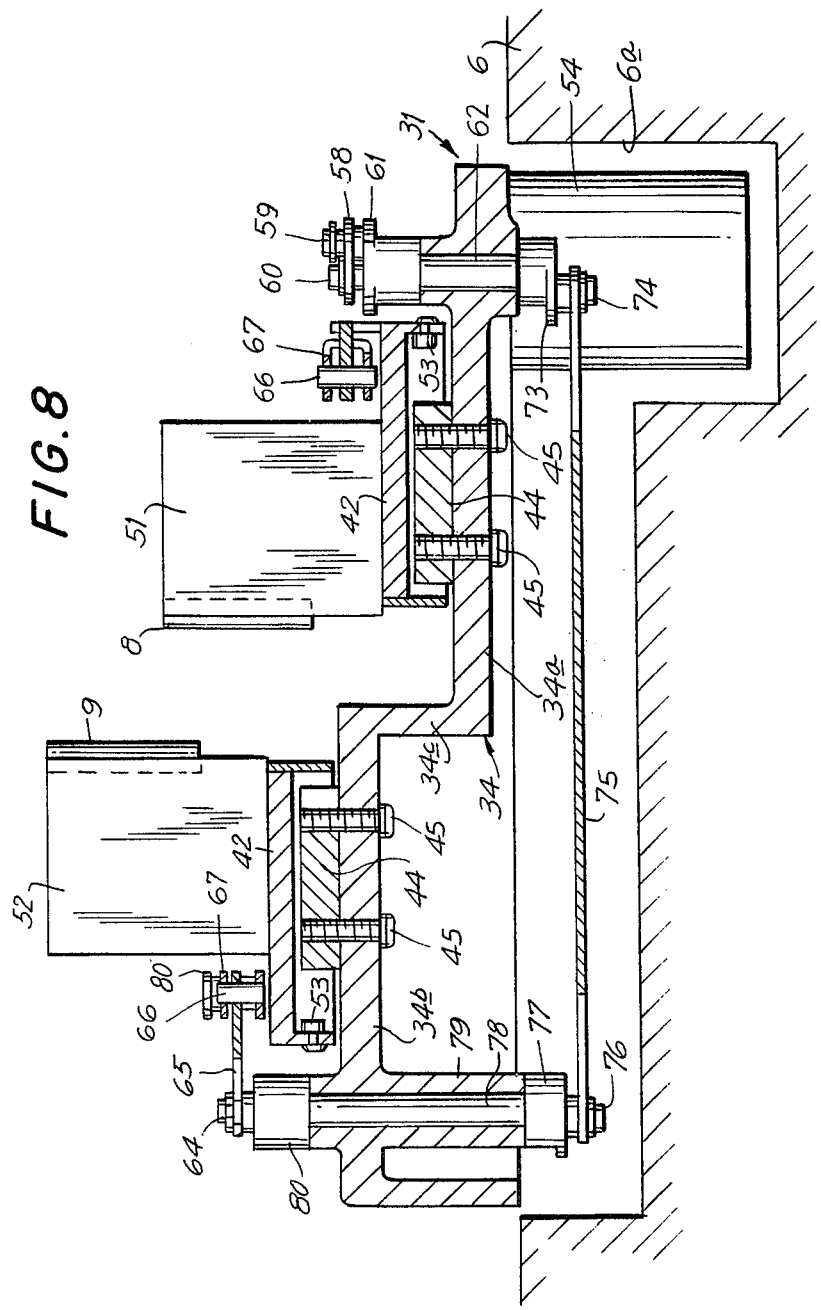

TAPE GUIDE DEVICE FOR VIDEO TAPE RECORDER

BACKGROUND OF THE INVENTION

1. Field of the Invention

This invention relates generally to video tape recorders and other apparatus in which a tape is wound about a guide drum for action on the tape, for example, for having signals recorded on, or reproduced from the tape, and the invention is more particularly directed to an improved tape guiding device for such apparatus.

2. Description of the Prior Art

In the standards established by the Society of Motion Picture and Television Engineers (SMPTE) for one-inch type-C, helical-scan video tape recording, it is specified that the tape entrance and exit guide elements for guiding the tape wound about the guide drum in an Ω-shaped configuration should provide a tape wrap angle such that the video record vertical-interval dropout is $10.00 \pm 0.25$ horizontal lines due to loss of head-to-tape contact, with no electronic switching of the recording signal. It is inherent in such standard that the tape entrance and exit guide elements be operatively positioned relatively close to each other and also close to the peripheral surface of the drum. Although it has been the practice, for example, in the broadcast quality video tape recorder available under the designation BVH-1000A from Sony Corporation, the assignee of the present application, to mount the tape entrance and exit guide elements for relatively small movements in various directions relative to the tape guide drum, such small movements are only for the purpose of effecting tracking adjustments and do not substantially affect the distances between the entrance and exit guide elements or between the latter and the periphery of the guide drum. Thus, the tape entrance and exit guide elements, in existing VTRs provided with the type-C helical-scan video tape recording format, remain relatively close to each other and to the peripheral surface of the guide drum when the tape is being wound about the guide drum, or unwound therefrom. Therefore, it is quite difficult to wind or wrap the tape on the guide drum and to remove the tape therefrom, and there is the danger that the tape may be damaged during such operations, particularly when seeking to engage the tape in the narrow clearances between the tape entrance and exit guide elements and between the latter and the peripheral surface of the drum.

OBJECTS AND SUMMARY OF THE INVENTION

Accordingly, it is an object of this invention to provide a tape guide device particularly suited for use in a type-C helical-scan VTR, and which avoids the foregoing problems encountered in existing VTRs of such type.

More particularly, it is an object of this invention to provide a tape guide device having tape entrance and exit guide elements which, in operative positions thereof, are disposed relatively close to each other and to the peripheral surface of the tape guide drum for satisfying the previously-noted vertical-interval dropout limitations of the type-C, helical-scan video tape recording format, but which are conveniently movable away from each other and away from the peripheral drum surface for facilitating the winding of the tape on, or the unwinding of the tape from the peripheral surface of the drum.

Another object is to provide a tape guide device, as aforesaid, in which the operative positions of the tape entrance and exit guide elements relative to each other and relative to the peripheral surface of the tape guide drum are reliably and accurately established and maintained even when the tape guide elements are repeatedly moved to and from such operative positions.

In accordance with an aspect of this invention, in an apparatus, such as, a VTR, including a tape guide drum having a root portion at which it is supported, and elongated entrance and exit tape guide elements adapted to be disposed in operative positions relatively close to each other and to the periphery of the drum for guiding a tape wound about the drum in an Ω-shaped configuration between the entrance and exit tape guide elements; a mounting structure for the tape guide elements comprising a base member fixedly located adjacent the drum's root portion in a predetermined position in respect to the drum periphery, first and second guide support members having the entrance and exit tape guide elements respectively attached thereto and being mounted on the base member to dispose the tape guide elements adjacent the drum periphery with the longitudinal axes of the tape guide elements generally parallel to the axis of the drum, and means mounting at least one of the guide support members for movement relative to the base member from an operative position corresponding to the operative position of the respective tape guide element in a direction which increases the distance of the respective tape guide element from the other guide element and from the drum periphery, thereby to facilitate winding and unwinding of the tape in respect to the drum.

Preferably, in a mounting structure for the tape guide elements according to this invention, as aforesaid, cooperative rectilinear guiding means are provided on the base member and on each guide support member movable relative thereto for causing the direction of relative movement of the respective guide support member to diverge at an acute angle from a plane which is tangent to the periphery of the drum between the operative positions of the entrance and exit tape guide elements.

Further, it is preferred to provide a drive means mounted on the base member and being coupled with each of the guide support members movable relative thereto for selectively moving each such guide support member to and from the operative position thereof. In such preferred arrangement, stop means are provided for limiting the movement of each of the movable guide support members in the direction toward its operative position, and the coupling of the drive means to each movable guide support member includes elastically yieldable transmission means which is compressed in the course of the movement of the respective guide support member to its operative position by which the drive means for reliably locating the guide support member in its operative position against the stop means.

The above, and other objects, features and advantages of this invention, will be apparent in the following detailed description of an illustrative embodiment thereof when read in connection with the accompanying drawings in which the same or corresponding parts are identified by the same reference numerals in the several views.

BRIEF DESCRIPTION OF THE DRAWINGS

FIGS. 7 and 8 are views similar to those of FIGS. 2 and 3, respectively, but showing the entrance and exit tape guide elements moved away from their operative positions.

DETAILED DESCRIPTION OF A PREFERRED EMBODIMENT

Figure 1:
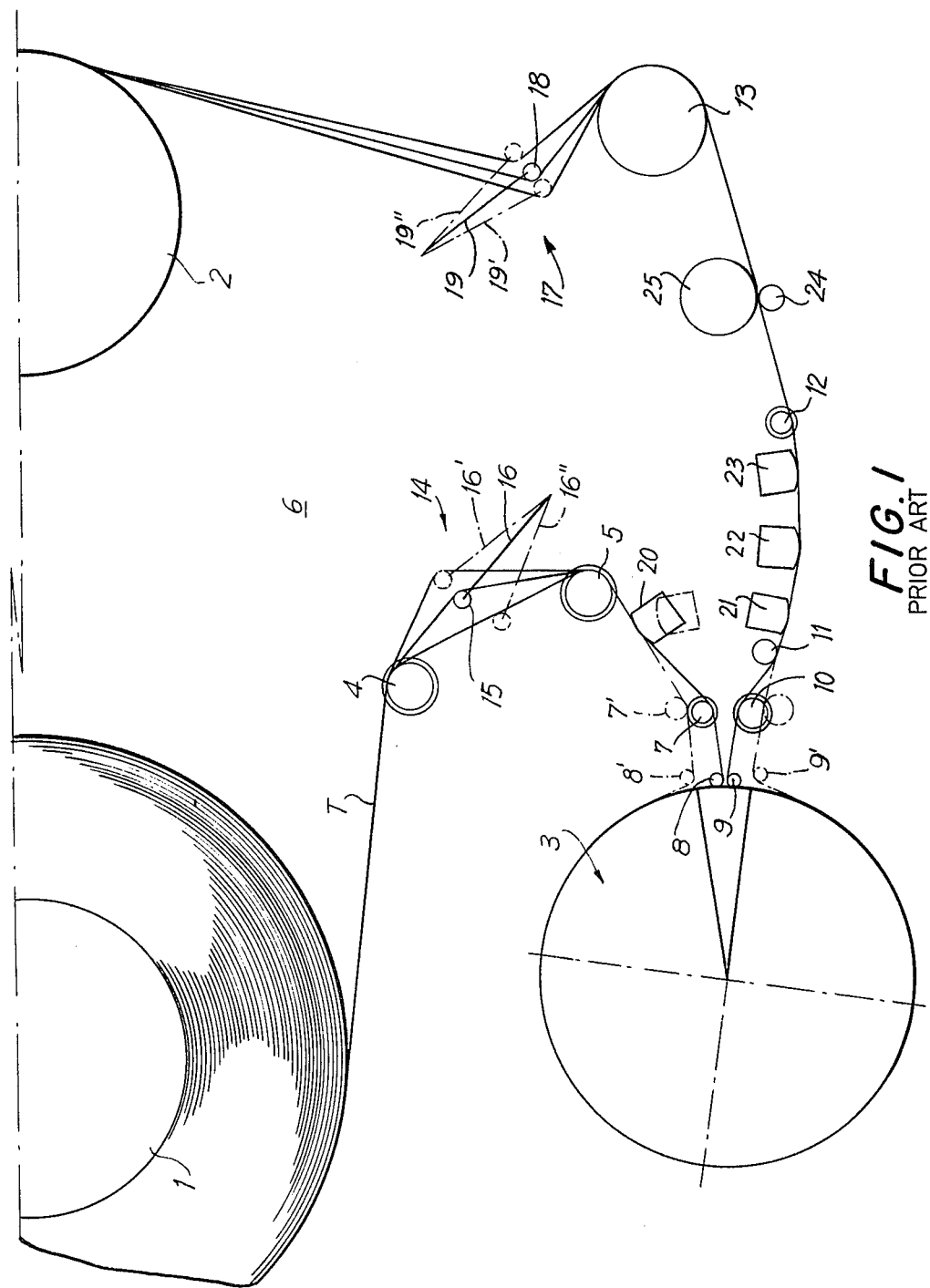
FIG. 1 is a diagrammatic plan view of a tape transporting system of a VTR of the type to which the present invention is advantageously applied.

Referring to the drawings in detail, and initially to FIG. 1 thereof, it will be seen that a broadcast quality, helical-scan video tape recorder (VTR) for recording with the Society of Motion Picture and Television Engineers (SMPTE) type-C format, and hence being particularly suited to have the present application applied thereto, is there shown to include a supply reel base 1, a take-up reel base 2 and a guide drum 3 having a rotary magnetic head assembly (not shown) as a part thereof. In normal recording or reproducing operation of the VTR, a magnetic tape T unwound for a supply reel on base 1 is guided about a substantial portion of the periphery of drum 3 and then led to a take-up reel on base 2 for rewinding thereon. In the illustrated arrangement for thus transporting the tape T, the latter guided from the supply reel on base 1 to the surface of drum 3 by means of successive, spaced apart guide rollers 4 and 5 suitably mounted on a chassis 6 and a tapered guide post 7 by which the tape is led to a tape entrance guide element 8 closely adjacent to the peripheral surface of drum 3. After being wound about the periphery of drum 3 in an Ω-shaped configuration, tape T is guided away from the drum by a tape exit guide element 9 which is also closely adjacent the drum periphery, and then by a guide roller 10. Thereafter, the tape is guided to the take-up reel on base 2 by a guide roller 11, a guide post 12 and a timer roller 13 which are suitably spaced apart on chassis 6.

A supply side tension adjusting device 14 acts on tape T between guide rollers 4 and 5 and includes a post 15 engaging the tape and being mounted at the free end of a tension arm 16 which is suitably mounted at its opposite end and biased to be urged angularly to the position shown in broken lines at 16' when there is an absence of tension in the tape between the supply reel and drum 3. When a normal or desired tension occurs in tape T between the supply reel and drum 3, tension arm 16 is urged by the tape tension to the position shown in full lines on FIG. 1 at which post 15 slightly deflects the tape from a straight path between guide rollers 4 and 5. In the event of a maximum or excessive tension in the tape at the supply side, the tape run between guide rollers 4 and 5 achieves a straight path and the tension arm of tension adjusting device 14 assumes the position shown in broken lines at 16''.

A similar device 17 is shown to be provided for adjusting the tape tension at the take-up side, that is, between drum 3 and the take-up reel on base 2, and includes a post 18 acting on the tape T between timer roller 13 and the take-up reel and being mounted on the free end of a tension arm 19 which, at its opposite end, is suitably mounted so as to be biased to the position shown in broken lines at 19' when there is an absence of tension in the tape at the take-up side. When the tape tension in the tape at the take-up side is normal, such tension urges arm 19 to the position shown in full lines and, in the event of an increased or excessive tape tension, the tension arm supporting post 18 is urged to the position shown in broken lines at 19''.

Further, as shown on FIG. 1, in the VTR there illustrated, an erasing head 20 is disposed between guide roller 5 and guide post 7 and is operative for erasing the full width of tape T, that is, for erasing the video and audio signals. Heads 21, 22 and 23 are mounted, in succession, between roller 11 and guide post 12 and are selectively operative for erasing an audio signal, for recording or reproducing an audio signal, and for monitoring the audio signal when the same is being recorded by head 22, respectively. A capstan 24 is disposed at one side of the path of tape T between guide post 12 and timer roller 13 and cooperates with a pinch roller 25 at the opposite side of the tape path for longitudinally driving the magnetic tape.

As earlier mentioned, the SMPTE standard for one-inch type-C, helical-scan video tape recording require that the tape wrap angle on drum 3 be such that the video record vertical-interval dropout be 10.00±0.25 horizontal lines due to loss of head-to-tape contact. In order to satisfy that specification, the tape entrance and exit guide elements 8 and 9 must be operatively positioned close to each other and close to the periphery of drum 3, as shown in full lines on FIG. 1. However, when the guide elements 8 and 9 are thus operatively positioned, it is difficult to avoid damaging the tape when passing the latter through the small clearances between guide elements 8 and 9 and between the latter and the periphery of drum 3 in the course of winding the tape about the drum, or when removing the tape therefrom.

Referring now to FIGS. 2-8, it will be seen that a tape guiding device 30 according to this invention provides a mounting structure for the tape entrance and exit guide elements 8 and 9 which avoids the foregoing problems and which generally includes a base member 31 fixedly located on chassis 6 in an adjusted position adjacent a lower or root portion 3A of drum 3 which is also fixed on chassis 6, and first and second guide support members 32 and 33 having the entrance and exit tape guide elements 8 and 9, respectively, attached thereto and being mounted on base member 31 so as to dispose tape guide elements 8 and 9 adjacent the periphery of drum 3 with the longitudinal axes of tape guide elements 8 and 9 extending generally parallel to the axis of the drum. In accordance with this invention, at least one of such guide support members 32 and 33 is mounted for movement relative to base member 31 from an operative position (FIGS. 2 and 3) corresponding to the operative position of the respective one of the tape guide elements 8 and 9 to a displaced or inoperative position (FIGS. 7 and 8) in which the distances of the respective one of the tape guide elements 8 and 9 from the other of such guide elements and from the periphery of drum 3 are substantially increased, thereby to facilitate winding of the tape T about drum 3 and the unwinding or removal of the tape therefrom.

Figure 3:
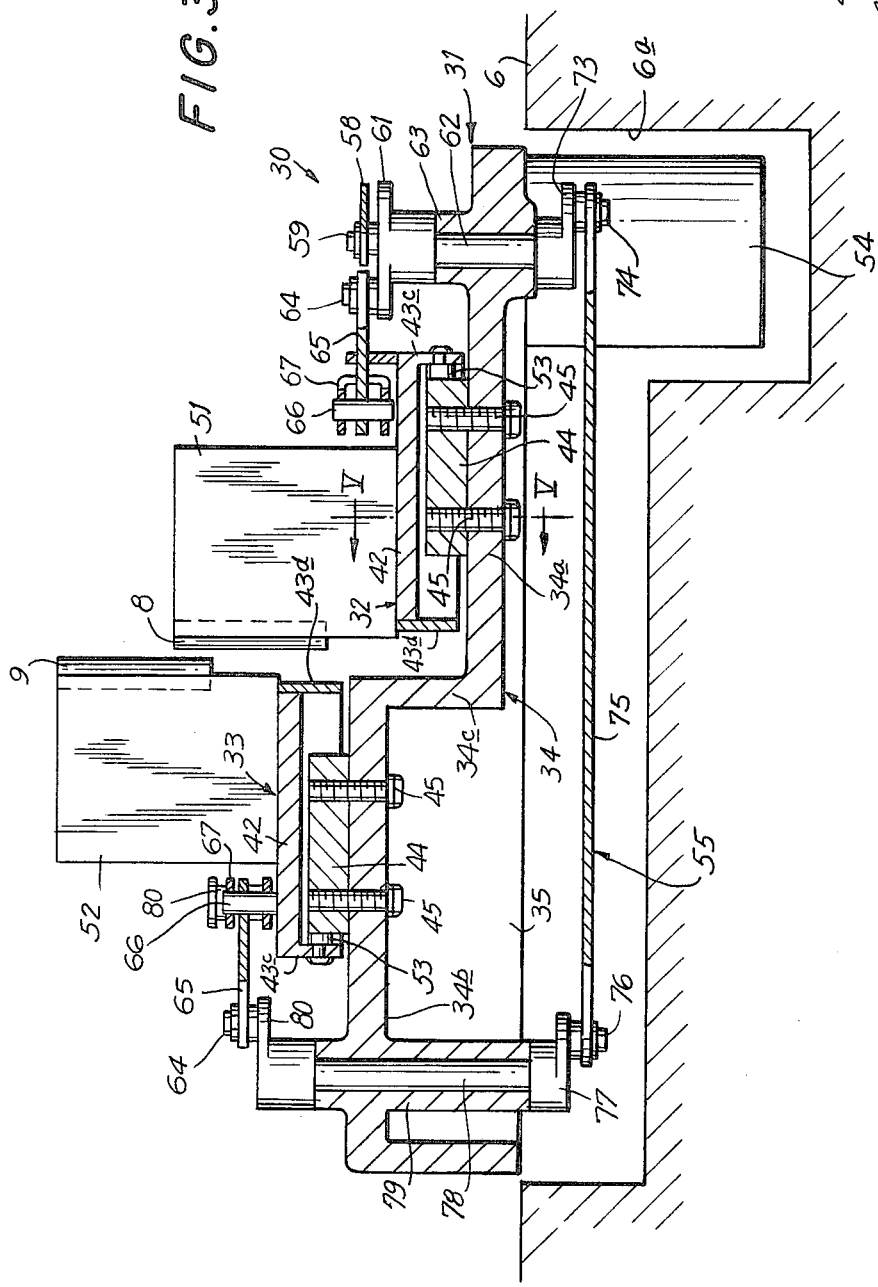
FIG. 3 is a sectional view taken along the line III—III on FIG. 2.

In the illustrated embodiment of the invention, base member 31 includes an elongated plate-like portion 34 which is stepped to provide a relatively low portion 34a at one side, a relatively high portion 34b at the opposite side and a connecting riser 34c therebetween (FIGS. 3 and 8). A peripheral flange 35 depends from plate-like portion 34, and pads 36a and 36b and pads 36c and 36d extend outwardly from flange 35 at the sides of base member 31 which face toward and away from, respectively, drum 3. Such pads 36a, 36b, 36c and 36d are formed with holes 37a, 37b, 37c and 37d, respectively, which are elongated in directions that are approximately tangential to arcs of circles concentric with drum 3. Screws 38 extend loosely through holes 37a–37d into tapped bores (not shown) in chassis 6 for adjustably securing base member 31 relative to the chassis. The pads 36a and 36b at the side of base member 31 facing toward drum 3 are formed with contiguous arcuate edges 39a and 39b, respectively, which generally conform to the arcuate configuration of the peripheral surface of drum 3, and positioning columns 40a and 40b are integral with pad 36a and 36b and project upwardly and outwardly from the latter at the ends of edge surfaces 39a and 39b remote from each other.

Figure 2:
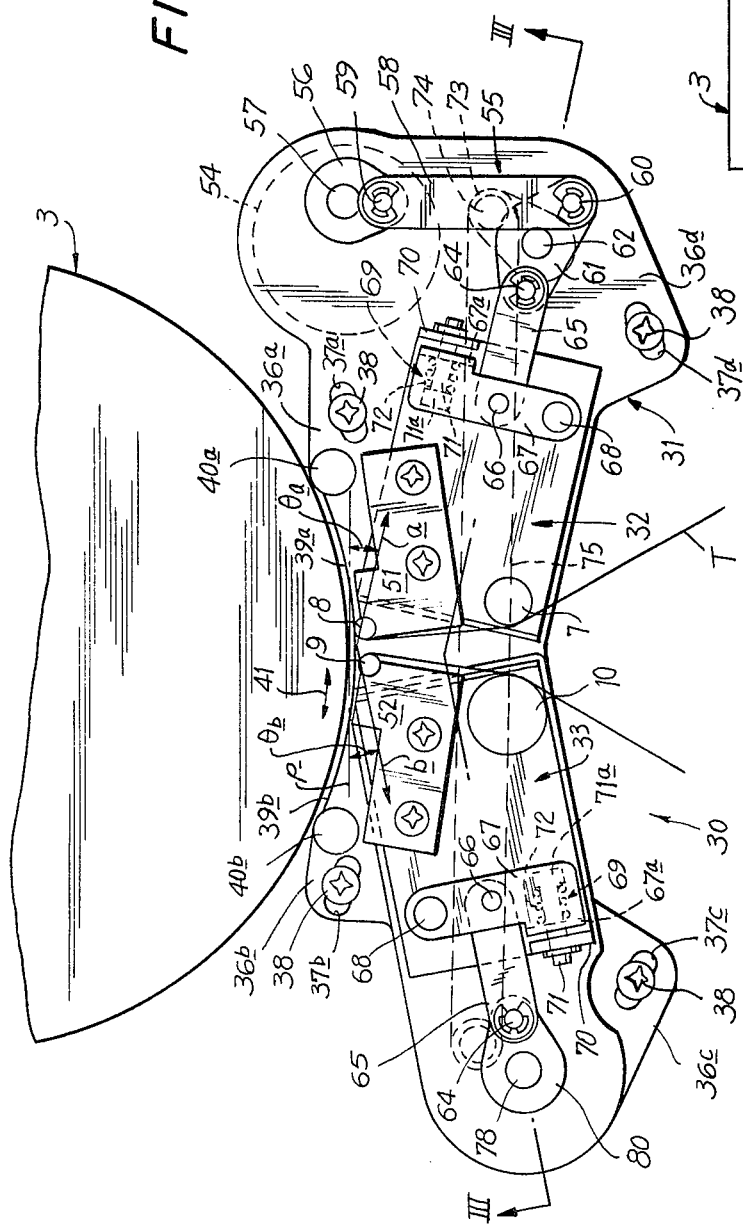
FIG. 2 is a top plan view of a tape guiding device according to an embodiment of the present invention, and which is shown associated with a tape guide drum and entrance and exit tape guide elements of the VTR shown on FIG. 1.
Figure 4:
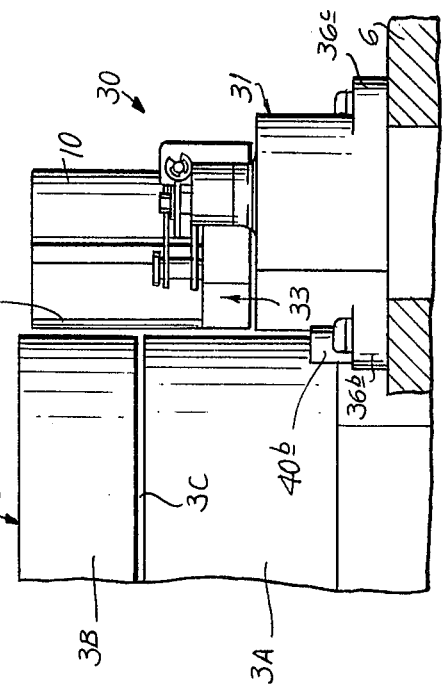
FIG. 4 is a side elevational view of the tape guiding device of FIG. 2, as viewed from the left side thereof.

Thus, as shown particularly on FIG. 2, positioning columns 40a and 40b are engageable against the periphery of drum 3 at angularly spaced locations on its lower or root portion 3A for precisely locating base member 31 relative to the drum, while permitting slight circumferential adjustments of base member 31 in the directions of the double-headed arrow 41, whereupon screws 38 can be tightened for locking base member 31 in its adjusted position.

The guide support members 32 and 33 are respectively mounted on portions 34a and 34b of base member 31 so that, as clearly shown on FIGS. 3 and 8, the respective tape entrance and exit guide elements 8 and 9 will be at different levels in respect to drum 3 for causing the tape which is wrapped or wound about drum 3 between guide elements 8 and 9 to be arranged substantially helically relative to the drum. The foregoing arrangement permits the rotary magnetic head assembly (not shown) mounted on a rotated upper portion 3B of drum 3 and extending through a circumferential gap 3C between drum portions 3A and 3B (FIG. 4) to scan skewed tracks on the tape T wrapped about the drum.

Figure 5:
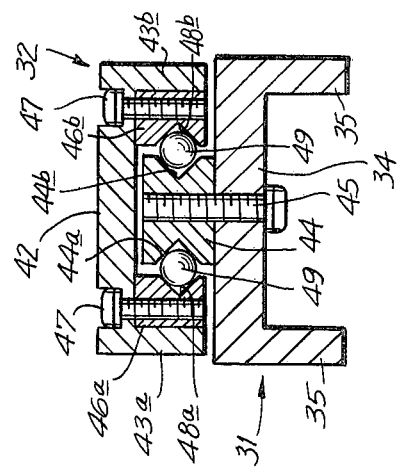
FIG. 5 is an enlarged sectional view taken along the line V—V on FIG. 3.

As shown particularly on FIGS. 3 and 5, guide support member 32 includes a plate portion 42 having integral depending flanges 43a, 43b and 43c extending along the opposite sides and one end thereof The guide support member 32 is mounted for rectilinear movement relative to base member 31 by means of a fixed inner race member 44 secured to plate portion 34a of base member 31 by screws 45 and having rectilinear raceways 44a and 44b extending along its opposite sides. Outer race members 46a and 46b are secured, as by screws 47, to the underside of plate 42 along the inner surfaces bf side flanges 43a and 43b, respectively, and are formed with rectilinear raceways 48a and 48b, respectively, which open towards the raceways 44a and 44b. Ball bearings 49 are received in raceways 44a and 48a and in raceways 44b and 48b for smoothly guiding the movement of guide support member 42 along member 44. The end of plate portion 42 remote from flange 43c may have a depending cover 43d.

The other guide support member 33 is similar in its structure to guide support member 32 and is movably mounted in the same manner on base member 31. Therefore, neither the specific structure of guide support member 33 nor its movable mounting on the respective plate portion 34b of base member 31 will be described in detail, and the several parts thereof are identified by the same reference numerals used in connection with the corresponding parts in the above specific description of guide support member 32.

Figure 7:
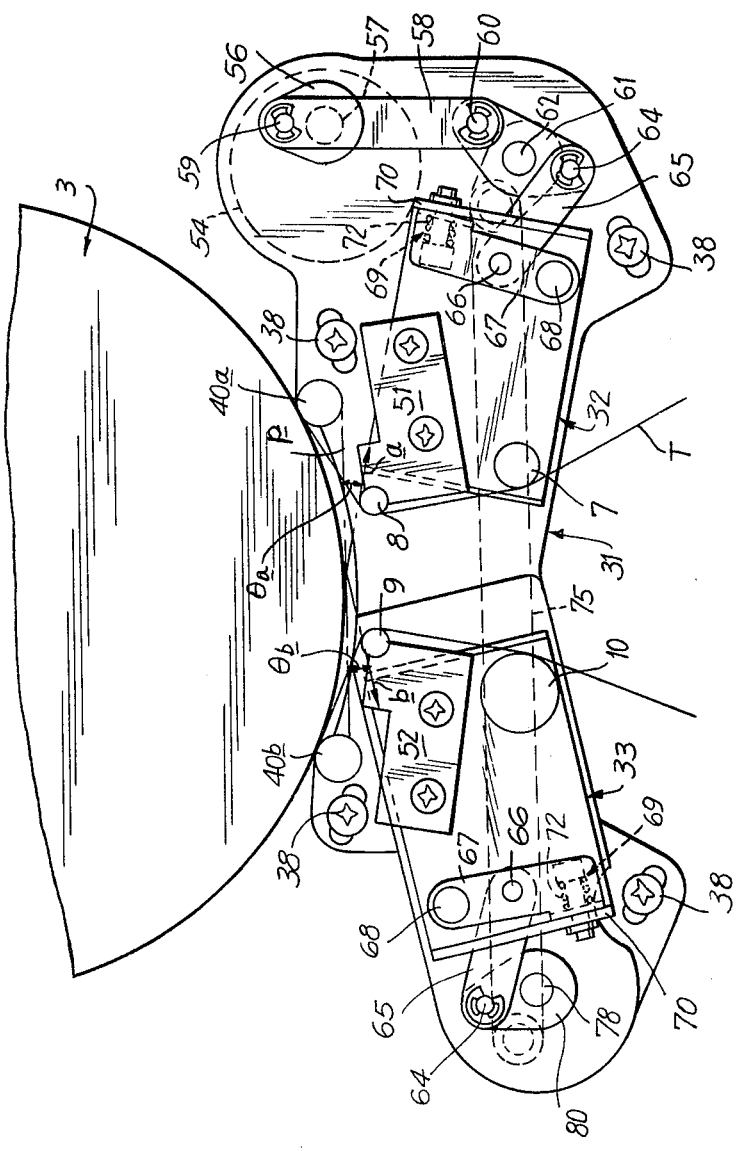

The fixed inner race members 44 are disposed relative to base member 31 so that the directions of the rectilinear movements of guide support members 32 and 33 which are parallel to the respective raceways 44a and 44b and, which are indicated by the arrows a and b, respectively, on FIGS. 2 and 7, will diverge at acute angles $\theta_a$ and $\theta_b$, respectively (FIG. 7), from a plane p which is tangent to the periphery of drum 3 between the operative positions of the entrance and exit tape guide elements 8 and 9.

As is well known in the prior art, the tape entrance and exit guide elements 8 and 9 are attached to the respective tape support members 32 and 33 by means of respective attaching devices 51 and 52 which permit independent adjustment of the height and inclination of the respective guide elements 8 and 9 relative to drum 3. Apart from such relatively small adjustments of guide elements 8 and 9 relative to the respective support members 32 and 33, the operative position of each of the tape guide elements 8 and 9 is determined by a stop member 53 secured to the inside surface of the respective end flange 43c and being engageable against an end surface of the respective inner race member 44.

Further, in the tape guide device 30 according to the invention, movements of tape entrance and exit guide elements 8 and 9 to and from their operative positions (FIGS. 2 and 3) are effected by a suitable motor 54 which depends from plate portion 34a of base member 31 and is adapted to be received in a suitable recess 6a (FIG. 3) in chassis 6. A drive mechanism 55 for effecting movements of guide support members 32 and 33 in response to the operations of motor 54 is shown to include a crank arm 56 (FIGS. 2 and 7) extending radially from an upper end of a rotary shaft 57 of motor 54 which projects upwardly above base member 31, a link 58 pivotally connected at one end, as at 59, to arm 56 and having its opposite end pivotally connected, as at 60, to one arm of a bell crank member 61 which is secured on the upper end of an idler shaft 62 journaled in a boss 63 formed on base member 31. Another arm of bell crank 61 is pivotally connected, as at 64, to a link 65 which is pivotally connected at its opposite end, as at 66, to a mid-portion of a lever member 67 extending laterally across plate-portion 42 of guide support member 32. One end of lever member 67 is pivotally connected to the respective plate portion 42, as at 68, while the opposite end portion of lever member 67 is yieldably connected to guide support member 32 by a yieldable transmission means 69. Such yieldable transmission means 69 is shown to include a lug 70 extending upwardly from the outer end of plate portion 42, a rod 71 extending from lug 70 and being slidable through a hole in a flange 67a at the respective end of lever member 67, and a helical compression spring 72 extending around rod 71 between a head 71a on the latter and flange 67a of lever member 67.

Figure 6:
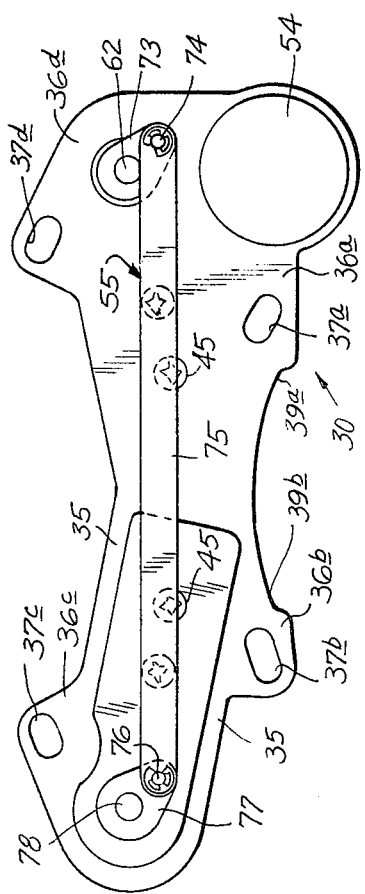
FIG. 6 is a bottom plan view of the tape guiding device shown on FIG. 2.

The drive mechanism 55 is further shown on FIGS. 3 and 6 to include a crank arm 73 secured to the lower end of idler shaft 62 below base member 31 and pivotally connected, as at 74, to one end of a link 75. The other end of link 75 is pivotally connected, as at 76, to a crank arm 77 secured to the lower end of an idler shaft 78 turnable in a boss 79 formed on portion 34b of base member 31. A crank arm 80 is secured on the upper end of idler shaft 78 and is pivotally connected, as at 64, to a link 65 which is, in turn, pivotally connected, at 66, to a lever member 67 pivoted, as at 68, on plate portion 42 of guide support member 33 and being further connected to the latter by an elastically yieldable transmission means 69 which is the same as the mechanism identified by that reference numeral in connection with guide support member 32.

The above described tape guiding device 30 according to this invention operates as follows:

When motor 54 is operated to turn its shaft 57 in the counterclockwise direction through approximately one-half revolution from the position shown on FIG. 2 to the position shown on FIG. 7, crank arm 56 on shaft 57 and link 58 turn bell-crank 61 in the counterclockwise direction through a predetermined angle to the position shown on FIG. 7. During such angular displacement of bell crank 61, link 65 pulls on lever member 67 to engage flange 67a of the latter with lug 70 on plate member 42 of guide support member 32 by which the latter is rectilinearly displaced in the direction of the arrow a to the position shown on FIG. 7 for disposing the respective tape entrance guide element 8 in its inoperative position. The counterclockwise turning of bell crank 61 is transmitted through shaft 62 and crank arm 73 to link 75 which is thereby moved toward the left, as viewed on FIG. 7, for causing crank arm 77 to turn idler shaft 78 in the counterclockwise direction. As a result of the foregoing, crank arm 80 is turned in the counterclockwise direction from the position of FIG. 2 to that of FIG. 7 and, by way of the respective link 65 and lever member 67, guide support member 33 is rectilinearly displaced in the direction of arrow b for disposing tape exit guide element 9 in its inoperative position.

It will be apparent that, with tape guide elements 8 and 9 in their inoperative positions, such guide elements are spaced relatively widely from each other and also from the peripheral surface of drum 3 so that the tape T can be easily wound about the drum and passed between the peripheral surface of drum 3 and guide elements 8 and 9 without the danger of damage to the tape. Further, in the illustrated embodiment of the invention, the tapered guide post 7 by which the tape is led to tape entrance guide element 8 is mounted on guide support member 32 and the guide roller 10 by which the tape is guided away from tape exit guide element 9 is mounted on guide support member 33. Thus, in the inoperative positions of guide support members 32 and 33 shown on FIGS. 7 and 8, post 7 and guide roller 10 are relatively widely spaced from each other to further facilitate the threading and unthreading of tape T about drum 3.

After the tape T has been wound or wrapped about drum 3, motor 54 can be operated to turn its shaft 57 and crank arm 56 thereon in the clockwise direction from the position shown on FIG. 7 to the position shown on FIG. 2. In the course of such movement of motor shaft 57, idler shafts 62 and 78 are turned in the clockwise direction with the result that links 65 extending from bell crank 61 and crank arm 80 displace the respective lever arms 67 in the directions for moving guide support members 32 and 33 toward their operative positions. However, prior to the final movements of shafts 62 and 78 in the clockwise directions, stops 53 engage the respective inner race members 44 for defining the final operative positions of guide support members 32 and 33. Thus, during the final increments of clockwise movement of shafts 62 and 78, levers 67 pivot about their respective pivot shafts 68 relative to guide support members 32 and 33 and compress the springs 72 of the respective elastically yieldable transmission means 69. Thus, at the completion of the turning of motor shaft 57 for moving tape entrance and exit guide elements 8 and 9 to their operative positions, compressed springs 72 of yieldable transmission means 69 provide corresponding spring forces by which guide support members 32 and 33 are tightly held in their operative positions with stops 53 engaging the ends of the respective inner race members 44. Such spring forces holding guide support members 32 and 33 in their operative positions ensure that neither the guide support members 32 and 33 nor the respective tape guide elements 8 and 9 will be subject to vibrations when in their operative positions. The elastically yieldable transmission means 69 interposed between each lever member 67 and the respective one of the guide support members 32 or 33 further ensures that the latter will be reliably moved to its operative position without injury to the drive mechanisms 55 even if there is an increase or decrease in the extent of the angular displacement of motor shaft 57 when moving tape guide elements 8 and 9 between their inoperative and operative positions.

It will also be appreciated that, since stop members 53, inner and outer race members 44 and 46a, 46b and bearings 49 are all substantially enclosed within the underside of the respective guide support members 32 and 33, it is unlikely that dust or dirt will interfere with the smooth movements of guide support members 32 and 33 to and from their operative positions or with the consistently accurate determination of their inoperative positions.

With guide support members 32 and 33 disposed in their operative positions, attaching mechanisms 51 and 52 can be adjusted for precisely positioning tape entrance and exit guide elements 8 and 9 relative to the peripheral surface of drum 3. Further, screws 38 can be loosened to permit adjustment of base member 31 in one or the other of the directions indicated by double-headed arrow 41 on FIG. 2 without changing the operative positions of guide elements 8 and 9 relative to each other. Thus, the location or position of the dropout allowed by the SMPTE standard for the type-C format can be adjusted without changing the amount or degree of the dropout. During such adjustment of the position of base member 31, the engagement of positioning columns 40a and 40b with the peripheral surface of lower drum portion 3A ensures that there will be no change in the operative positions of tape guide elements 8 and 9 relative to the peripheral surface of the drum 3.

After the operative positions of tape entrance and exit guide elements 8 and 9 have been adjusted relative to each other and relative to drum 3, the described arrangements by which guide support members 32 and 33 are movably mounted on base member 31, and by which the operative positions of such guide support members 32 and 33 are determined ensure that guide elements 8 and 9 can be thereafter repeatedly moved to and from their operative positions, as when loading and unloading the tape, without any danger that the adjustments of guide elements 8 and 9 will be disturbed.

Although the tape guide device 30 embodying this invention has been shown as having both its guide support members 32 and 33 movable between operative and inoperative positions, the invention can also be embodied in a tape guide device in which only one of the guide support members 32 and 33 is thus movable. Furthermore, if desired, the guide post 7 and guide roller 10 may be mounted in fixed positions, rather than being movable with the guide support members 32 and 33, respectively, as previously described. It will also be appreciated that, although the invention has been specifically described as being applied to a VTR having the SMPTE type-C format, the invention is similarly applicable to the tape guide devices of other VTRs or similar apparatus.

Having described a specific embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. In an apparatus including a chassis and a tape guide drum having a root portion at which it is secured to said chassis, and elongated entrance and exit tape guide elements adapted to be disposed in operative positions relatively close to each other and to the periphery of said drum for guiding a tape wound about said drum in an Ω-shaped configuration between said entrance and exit tape guide elements; a mounting structure for said tape guide elements comprising a base member adjustably located adjacent said root portion of the drum in a predetermined position in respect to said periphery of the drum, first and second guide support members having said entrance and exit tape guide elements respectively attached thereto and being mounted on said base member to support and dispose said tape guide elements adjacent said periphery of the drum at levels corresponding to the path of a tape in said Ω-shaped configuration and with the longitudinal axes of said tape guide elements generally parallel to the axis of said drum, fastening means adapted to be tightened for fixing the adjustably located base member to said chassis, means mounting at least one of said guide support members for movement relative to said base member from an operative position corresponding to said operative position of the respective one of said tape guide elements in a direction which increases the distance of said respective one of said guide elements from the other of said guide elements and from said periphery of the drum, thereby to facilitate winding and unwinding of the tape in respect to said drum, and a pair of spaced apart positioning members on said base member engagable against the periphery of said drum at said root portion of the latter for accurately locating said operative positions of the tape guide elements relative to said drum when said fastening means are tightened.

2. An apparatus according to claim 1; in which said means mounting said one guide support member on said base member includes cooperative rectilinear guiding means thereon for causing said direction of relative movement to diverge at an acute angle from a plane which is tangent to said periphery of the drum between said operative positions of said entrance and exit tape guide elements.

3. An apparatus according to claim 1; further comprising drive means mounted on said base member and being coupled with at least said one guide support member for selectively moving the latter to and from said operative position of the latter.

4. An apparatus according to claim 1; further comprising means mounting the other of said guide support members for movement relative to said base member from an operative position corresponding to said operative position of said other tape guide element in a direction which increases the distance of said other tape guide element from said one tape guide element and from said periphery of the drum.

5. An apparatus according to claim 4; further comprising drive means mounted on said base member, and means coupling said drive means with each of said guide support members for simultaneously moving both of said guide support members selectively to and from said operative positions of the latter.

6. An apparatus according to claim 5; in which each of said means mounting a guide support member for movement relative to the base member includes cooperative rectilinear guiding means on the respective guide support member and the base member for causing said direction of relative movement for said respective guide support member to diverge at an acute angle from a plane which is tangent to said periphery of the drum between said operative positions of the entrance and exit tape guide elements.

7. An apparatus according to claim 6; further comprising stop means limiting the movement of each of said guide support members in the direction to the operative position thereof; and in which said means coupling said drive means with each of said guide support members includes elastically yieldable transmission means which is compressed in the course of the movement of the respective guide support member to its operative position by said drive means for reliably locating the respective guide support member against said stop means.

8. An apparatus according to claim 6; in which said rectilinear guiding means includes cooperating rectilinear raceways on said base member and on the respective guide support member, and rolling bearing elements engaging between said raceways.

9. An apparatus according to claim 6; in which said base member has a stepped surface with first and second portions thereof at different levels, and said first and second guide support members are respectively mounted on said first and second portions of the stepped surface so that said entrance and exit tape guide elements, when in their operative positions, cause the tape guided thereby to be helically wound about said drum.

* * * * *